May 20, 1924.  
D. R. FINLEY  
1,494,892  
FASTENING DEVICE FOR NONSKID CHAINS  
Filed May 21, 1923

INVENTOR  
Donald R. Finley  
BY John W. Maupin  
ATTORNEY

Patented May 20, 1924.

1,494,892

UNITED STATES PATENT OFFICE.

DONALD R. FINLEY, OF SEATTLE, WASHINGTON.

FASTENING DEVICE FOR NONSKID CHAINS.

Application filed May 21, 1923. Serial No. 640,384.

*To all whom it may concern:*

Be it known that I, DONALD R. FINLEY, a citizen of the United States, residing at Seattle, in the county of King and State of Washington, have invented a new and useful Fastening Device for Nonskid Chains, of which the following is a specification.

My invention relates to improvements in fastening devices for non-skid chains and the principal objects of my invention are to provide a fastening device of simple, durable and economic construction that will hold the chains securely in place at all times. Other objects are to provide a fastening device which may be readily installed on the wheels of motor vehicles and by means of which the chains may be easily and rapidly secured around the tires of said wheels. Further objects are to provide a device whose use, when once installed, will require a minimum amount of chain the maximum of which will be disposed around the tire tread and in frictional engagement with the ground thereby effecting an increase in efficiency and a decrease in the cost of maintenance.

With the above and other objects in view which will appear as the description proceeds, the invention consists of the novel construction, adaptation, arrangement and combination of parts hereinafter described and claimed.

These objects are accomplished by devices illustrated in the accompanying drawings, wherein—

Figure 1:
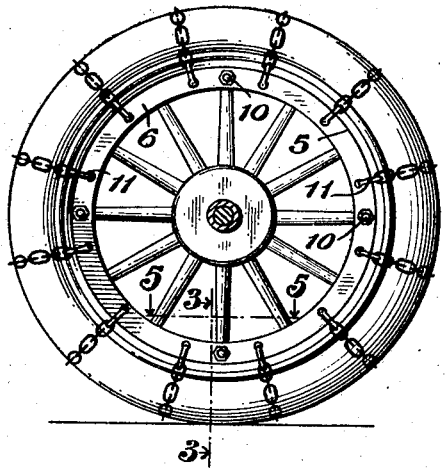
Figure 1 is a view in side elevation of an automobile wheel looking from the inside and showing the device secured thereto.
Figure 2:
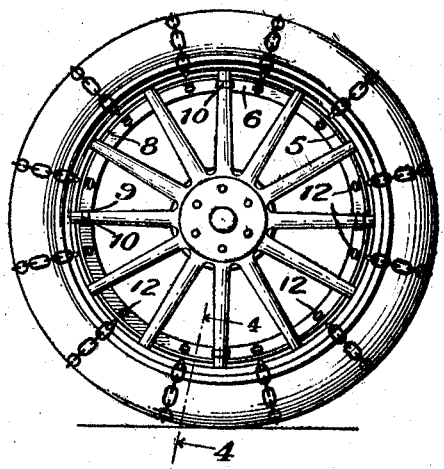
Fig. 2 is a similar view looking from the opposite or outside of the wheel.
Figure 3:
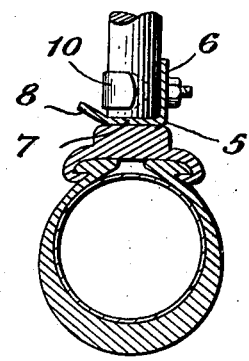
Fig. 3 is a view in transverse vertical section taken substantially on a broken line 3, 3 of Fig. 1.

Referring to the drawings throughout which like reference numerals designate like parts, the numeral 5 designates, as a whole, an annular member which is usually made of angle iron having a vertical flange 6 and a horizontal flange 7.

Figure 5:
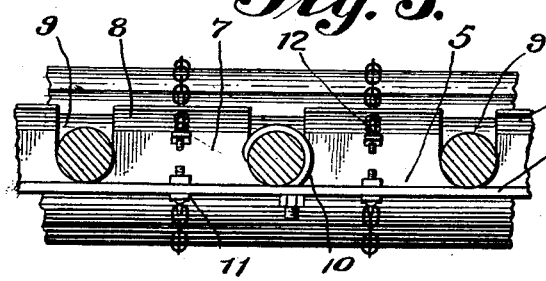
Fig. 5 is a view in horizontal section taken substantially on a broken line 5, 5 of Fig. 1.

The flange 7 is bent inwardly, as at 8, for reasons hereinafter described, and a plurality of slots 9 is provided therein in spaced apart relation to fit over the spokes of an automobile wheel as clearly shown in Fig. 5 of the drawings.

The periphery of the flange 7 is arranged to fit snugly against the inside of the wheel felly and, by virtue of the slots 9, the flange 6 is adapted to bear snugly against the spokes of said wheel where it is held by screw clamps 10 secured therethrough.

Hooks 11 are pivotally secured in spaced apart relation by bolts to the vertical flange 6, and spring hooks 12 pass oppositely through the deflected portion of the flange 7 where they are functionally secured by nuts 13 bearing against springs 14.

Figure 4:
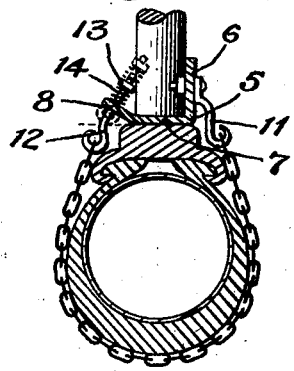
Fig. 4 is a view in transverse vertical section taken on a broken line 4, 4 of Fig. 2.

It will be noted, as indicated by dotted lines in Fig. 4, that the springs 14 will draw the hooks 12 inwardly and clear of the horizontal flange 7, and it will be obvious that the device may be readily installed from either side of the wheel.

In practice however it is preferable to install the device from the inside of the wheels, as shown in the drawings, for the reasons that same is less conspicuous in that position and will guard against theft as same may not be removed without first removing the wheel.

To install the device same is slipped inside of the felly with the spokes of the wheel bearing within the slots 9. The screw clamps 10 are then hooked around said spokes and their nuts are tightened up to hold same securely in position.

The chain is then installed by placing one link over the spring hook 12, drawing downwardly against the spring 14 while said chain is passed under the tire, and then catching the other end over the hook 11. The tension of the spring 14 will hold the chain snugly around the tire and will automatically compensate for any slack caused by reduced air pressure within said tire.

It will be obvious that the chains may be readily removed, and likewise the device as a whole although same may be left on during the winter or rainy seasons without being conspicuous or detrimental in any way. It will also be apparent that the use of the device will not mar or damage any part of the wheel and may be used by the most inexperienced person, While short chains have been used in the description and drawings, it will be understood that long chains may be used with equal facility and may be installed in zig-zag or in any other desired fashion. The device may be varied for different makes of vehicles and the number of hooks, slots, clamps and other parts may likewise be changed in accordance with such variations.

Having thus described my invention, what I claim and desire to secure in Letters Patent is:—

1. A fastening device for non-skid chains comprising an annular member having a vertical and a horizontal flange, said horizontal flange having slots arranged to receive the spokes of a motor vehicle wheel, means for securing said annular member to said wheel, and means for securing chains to said annular member substantially as described.

2. A fastening device for non-skid chains comprising an annular member having a vertical and a horizontal flange, said horizontal flange having slots arranged to receive the spokes of a motor vehicle wheel, the outer portion of said horizontal flange deflected inwardly, screw clamps for securing said annular member to said wheel, hooks pivotally secured to said vertical flange in spaced apart relation, and spring hooks secured through the deflected portion of said horizontal flange substantially as described.

DONALD R. FINLEY.